Oct. 20, 1953 P. E. REEVES 2,656,465
SYNCHRONIZING SYSTEM
Filed May 12, 1948
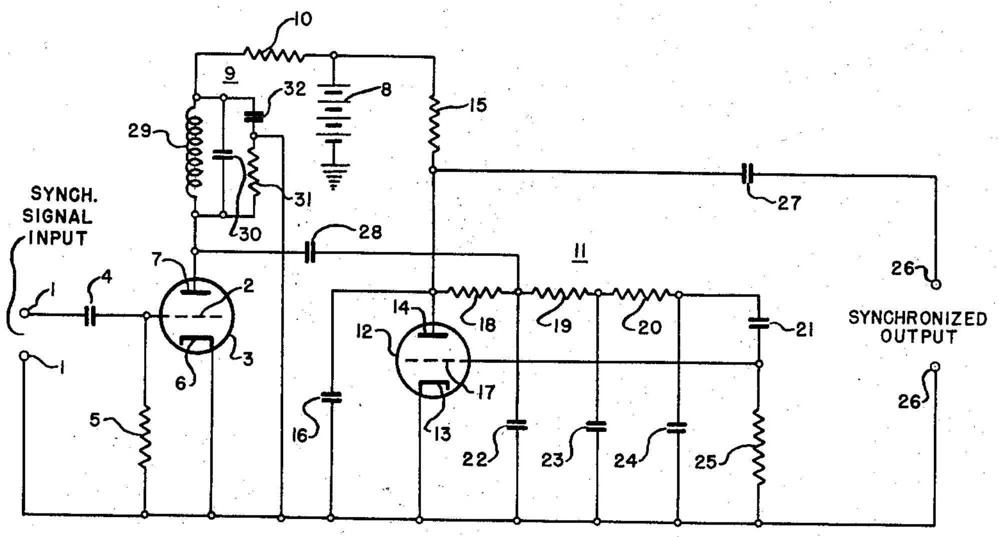
PIERCE E. REEVES
*INVENTOR.*
BY [signature]
*HIS AGENT*

Patented Oct. 20, 1953

2,656,465

UNITED STATES PATENT OFFICE 2,656,465

SYNCHRONIZING SYSTEM

Pierce E. Reeves, Park Ridge, Ill., assignor to Zenith Radio Corporation, a corporation of Illinois Application May 12, 1948, Serial No. 26,642

4 Claims. (Cl. 250—36)

Application Serial No. 26,643, filed May 12, 1948, by Pierce E. Reeves, and assigned to the present assignee, now abandoned, discloses a television receiver synchronizing system which utilizes a stable oscillator oscillating in its free-running state substantially at the synchronizing frequency to synchronize the sweep of the receiver image tube with received synchronizing signals. This oscillator circuit is locked-in and synchronized as to phase and frequency with received synchronizing signals by injecting these signals directly into the oscillator circuit. It was found in such a system that noise signals, and the like, do have a slight effect on the phasing of the oscillator circuit, and it is an object of this invention to provide an improved system for synchronizing such an oscillator circuit with received synchronizing signals, in which the effect of noise signals, and the like, is materially reduced.

It is therefore an object of this invention to provide an improved system for synchronizing an oscillator circuit with received synchronizing signals, this circuit being simple and inexpensive to construct.

It is a further object of this invention to provide such an improved system in which synchronism is maintained between the oscillator and the received synchronizing signals, even when the received signals are of low amplitude and under adverse signal-to-noise conditions.

Yet a further object of this invention is to provide a stable oscillator circuit which in the absence of synchronizing signals oscillates in its free-running state substantially at the synchronizing frequency, and to further provide an improved arrangement for synchronizing the oscillator as to phase and frequency with received synchronizing signals, such system being capable of maintaining synchronism even in the presence of noise signals and the like.

The features of this invention, which are believed to be new, are set forth with particularity in the appended claims. The invention itself, however, together with further objects and advantages thereof may best be understood by reference to the acocmpanying drawing in which the single figure shows a preferred embodiment of the invention.

Referring now to the figure, composite signals such as television signals containing synchronizing pulses are impressed across terminals 1, and these signals are applied to control electrode 2 of discharge device 3 through a capacitor 4, control electrode 2 being connected to ground through a grid leak resistor 5. The cathode 6 of device 3 is connected to ground, and the anode 7 of this device is connected to the positive terminal of a unidirectional potential source 8 through network 9 and a series connected resistor 10, the negative terminal of source 8 being grounded.

The device 3 is so connected to remove or clip positive going synchronizing pulses from the signal impressed across terminals 1, and these synchronizing pulses excite network 9 in a manner to be described. The anode of device 3 is coupled to a conventional oscillator circuit, which oscillator is preferably a resistance-capacity oscillator shown at 11.

The resistance-capacity oscillator 11 consists of a discharge device 12, having a cathode 13 connected to ground, and an anode 14 connected to positive source 8 through a resistor 15. Anode 14 is coupled to ground through capacitor 16, and this anode is further coupled to control electrode 17 through series connected resistors 18, 19 and 20 and capacitor 21. The common junction of resistors 18 and 19 is coupled to ground through capacitor 22, the common junction of resistors 19 and 20 is coupled to ground through capacitor 23, the common junction of resistor 20 and capacitor 21 is coupled to ground through capacitor 24, and control electrode 17 is connected to ground through grid leak resistor 25.

The oscillator circuit 11 is adjusted to have a free-running frequency that is substantially the frequency of the synchronizing pulses, and the usual sine-wave signal having this frequency is produced across terminals 26, one of the terminals 26 being grounded and the other coupled to anode 14 of device 12 through capacitor 27. The frequency of oscillator 11 is synchronized with the synchronizing pulses by reason of the connection between anode 7 of device 3 and the common junction of resistors 18 and 19 through capacitor 28, this synchronism being effected in a manner to be described.

Network 9 consists of an inductance coil 29, which is shunted by capacitor 30 to form tuned circuit 29—30. This tuned circuit is damped by resitsor 31 effectively connected thereacross through a capacitor 32, the common junction of capacitor 32 and resistor 31 being connected to ground. The tuned circuit is adjusted to resonate at such a frequency that the wavelength of a signal at this frequency is equal to twice the width of the synchronizing pulse. In response to the synchronizing pulses, a train of damped oscillations appears across this circuit as the circuit is highly shock excited by these pulses. The damping resistor 31 must have a value sufficiently low to damp the oscillations produced by the synchronizing pulses in the network 9, so that each burst of oscillation produced by the individual pulses is damped before the next succeeding pulse shock excites the tuned circuit and produces a succeeding burst of oscillation. However, the value of the resistor 31 is sufficiently large so that the quality factor or Q of the network 9 is relatively high and the response of this network to pulses of widths or time duration, other than the synchronizing pulses, such as noise pulses and the like, is relatively low. Hence, network 9 accepts the synchronizing signals and a train of damped oscillations appears across tuned circuit 29—30 in response thereto, and substantially all noise signals, and the like, are suppressed thereby.

When synchronizing pulses are impressed across network 9, the tuned circuit 29—30 is highly excited thereby and, due to the damping of this circuit, a train of damped symmetrical signals is produced, this train being injected into oscillator 11 through capacitor 28.

Hence, the synchronizing pulses contained in the signal impressed across terminals 1 cause the train of symmetrical damped oscillations to be injected into the oscillator 11, these damped oscillations occurring at the repetition rate of the synchronizing pulses. The symmetrical damped oscillations cause the oscillator 11 to lock-in therewith above and below the free-running frequency of the oscillator, and hence provide a symmetrical lock-in range. Therefore, even when the synchronizing pulses are of relatively low amplitude, oscillator 11 locks-in with the damped oscillations and oscillates at the synchronizing frequency.

This invention therefore provides a simple and inexpensive system for maintaining synchronism between an oscillator circuit and received synchronizing pulses, which oscillator oscillates at substantially the synchronizing frequency in the absence of the synchronizing pulses, and is synchronized therewith when such pulses are received, even though they have relatively low amplitude. This invention further provides such a system in which synchronism is not appreciably affected by the presence of noise signals and the like in the received signals.

Some of the advantages of the use of network 9 in the synchronizing system may be listed as follows:

*a.* Unwanted signals, such as noise signals and the like, are suppressed by the network 9.

*b.* Symmetrical lock-in above and below the synchronizing frequency provides a positive synchronization between the oscillator and the synchronizing signals.

*c.* The combination of the damped tuned circuit and the resistance-capacity oscillator makes the use of this oscillator, with its stable oscillating characteristics and favorable lock-in characteristics, of great advantage in a television receiver for synchronizing purposes.

*d.* The tuned circuit filters out all but one frequency band, and since the resistance-capacity oscillator is effectively a low pass filter of lower frequency cut-off than the tuned frequency of the tuned circuit, the synchronizing signal is effectively removed from the output of the oscillator.

Oscillators other than the resistance-capacity type may be synchronized with synchronizing signals by the present arrangement. However, because of its simplicity, stable operating characteristics, and the ease by which synchronizing signals may be injected into the circuit to synchronize the oscillator, the resistance-capacity type of oscillator is preferred.

While a certain embodiment of the invention has been shown and described, modifications may be made without departing therefrom, and the appended claims are intended to cover any such modifications as fall within the true spirit and scope of the invention.

I claim:

1. A synchronizing system for television receivers and the like comprising: a self-oscillating circuit; an electron discharge device having an anode, a cathode and a control electrode; an input circuit coupled between said control electrode and a cathode for receiving a periodic pulse synchronizing signal; a damped resonant circuit included in the circuit of said anode and tuned to be shock excited by said periodic pulse synchronizing signal to produce a train of damped symmetrical oscillations thereacross; and means coupling said anode to said self-oscillating circuit for injecting said train of damped oscillations into said self-oscillating circuit to synchronize the frequency and phase of said self-oscillating circuit with said periodic pulse synchronizing signal.

2. A synchronizing system for television receivers and the like comprising: a self-oscillating circuit having a predetermined free-running frequency; an electron discharge device having an anode, a cathode and a control electrode; an input circuit coupled between said control electrode and said cathode for receiving recurring synchronizing pulses having a repetition frequency substantially equal to the frequency of said self-oscillating circuit; a damped resonant circuit included in the circuit of said anode and tuned to be shock excited by said synchronizing pulses to produce a train of damped symmetrical oscillations thereacross; and means coupling said anode to said self-oscillating circuit for injecting said train of damped oscillations into said self-oscillating circuit to synchronize the frequency and phase of said self-oscillating circuit with said synchronizing pulses.

3. A synchronizing system for television receivers and the like comprising: a self-oscillating circuit having a predetermined free-running frequency; an electron discharge device having an anode, a cathode and a control electrode; an input circuit coupled between said control electrode and said cathode for receiving recurring synchronizing pulses having a repetition frequency substantially equal to the frequency of said self-oscillating circuit and having a predetermined individual time duration; a damped resonant circuit included in the circuit of said anode and tuned to be highly shock excited by pulses of an individual time duration corresponding to said synchronizing pulses to produce a train of damped symmetrical oscillations thereacross in response to said synchronizing pulses; and means coupling said anode to said self-oscillating circuit for injecting said train of damped oscillations into said self-oscillating circuit to synchronize the frequency and phase of said self-oscillating circuit with said synchronizing pulses.

4. A synchronizing system for television receivers and the like comprising: a self-oscillating circuit having a predetermined free-running frequency; an electron discharge device having an anode, a cathode and a control electrode; an input circuit coupled between said control electrode and said cathode for receiving recurring synchronizing pulses having a repetition frequency substantially equal to the frequency of said self-oscillating circuit and having a predetermined individual time duration; a high quality resonant circuit included in the circuit of said anode and tuned to be highly shock excited by pulses of an individual time duration corresponding to said synchronizing pulses and to discriminate against pulses of other time durations, the natural resonant frequency of said resonant circuit having a wavelength equal to twice the width of each of said synchronizing pulses; a damping resistor shunting said high quality resonant circuit and damping said resonant circuit sufficiently to cause a train of damped oscillations to be produced across said resonant circuit in response to said synchronizing pulses; and means coupling said anode to said self-oscillating circuit for injecting said train of oscillations into said self-oscillating circuit to synchronize the frequency and phase of said self-oscillating circuit with said synchronizing pulses.

PIERCE E. REEVES.

References Cited in the file of this patent

UNITED STATES PATENTS

| Number | Name | Date |
|---|---|---|
| 2,277,000 | Bingley | Mar. 17, 1942 |
| 2,288,554 | Smith, Jr. | June 30, 1942 |
| 2,356,201 | Beers | Aug. 24, 1944 |
| 2,419,569 | Labin et al. | Apr. 29, 1947 |
| 2,445,933 | Beste | July 27, 1948 |
| 2,462,061 | Beatty | Feb. 22, 1949 |

FOREIGN PATENTS

| Number | Country | Date |
|---|---|---|
| 569,339 | Great Britain | May 18, 1945 |

OTHER REFERENCES

War Department Manual TM 11-466, article entitled "Radar Electronic Fundamentals," pages 187-191; printed December 30, 1943; available to public July 5, 1946. Copy in Division 10.